United States Patent
Kemme et al.

(10) Patent No.: US 11,582,239 B2
(45) Date of Patent: Feb. 14, 2023

(54) USER ACCESS AND IDENTITY LIFE-CYCLE MANAGEMENT

(71) Applicant: Intuit Inc., Mountain View, CA (US)

(72) Inventors: David Andrew Kemme, San Diego, CA (US); Thomas Fields Hash, Los Altos, CA (US); Bernard Samuel Diwakar, San Jose, CA (US); Hrushikesh Gudala, San Diego, CA (US); Supreetha Kashyap, Cupertino, CA (US)

(73) Assignee: Intuit Inc., Mountain View, CA (US)

( * ) Notice: Subject to any disclaimer, the term of this patent is extended or adjusted under 35 U.S.C. 154(b) by 320 days.

(21) Appl. No.: 16/670,716

(22) Filed: Oct. 31, 2019

(65) Prior Publication Data
US 2021/0136077 A1    May 6, 2021

(51) Int. Cl.
*H04L 9/40* (2022.01)
*H04L 47/80* (2022.01)

(52) U.S. Cl.
CPC .......... *H04L 63/102* (2013.01); *H04L 47/808* (2013.01); *H04L 63/068* (2013.01); *H04L 63/101* (2013.01); *H04L 63/108* (2013.01)

(58) Field of Classification Search
CPC .... H04L 63/102; H04L 63/108; H04L 63/101
See application file for complete search history.

(56) References Cited

U.S. PATENT DOCUMENTS

| | | | |
|---|---|---|---|
| 8,656,465 B1 * | 2/2014 | Fong-Jones | G06F 21/6281 726/5 |
| 8,769,642 B1 * | 7/2014 | O'Neill | H04L 63/10 726/5 |
| 8,813,225 B1 * | 8/2014 | Fuller | H04L 67/16 726/23 |
| 8,973,108 B1 * | 3/2015 | Roth | H04L 63/08 726/5 |
| 2002/0002677 A1 * | 1/2002 | Eade | G06F 21/629 713/164 |
| 2004/0054896 A1 * | 3/2004 | Himmel | G06F 21/6218 726/4 |
| 2004/0054931 A1 * | 3/2004 | Himmel | G06F 21/6218 726/21 |
| 2004/0153552 A1 * | 8/2004 | Trossen | H04L 67/16 709/229 |
| 2005/0138648 A1 * | 6/2005 | Ahmed | H04L 67/40 719/328 |
| 2005/0166260 A1 * | 7/2005 | Betts | G06F 21/6218 726/4 |

(Continued)

*Primary Examiner* — Jason Chiang
(74) *Attorney, Agent, or Firm* — Paradice & Li LLP (57) ABSTRACT

A method and processing system for managing user access to one or more resources is disclosed. A central service may receive an access change request message regarding a user. The access change request message may include a user identifier, a user role, and an access action for the user. Example access actions may include adding or removing user access with respect to a resource. The central service may determine which resources are associated with the user role and transmit one or more event messages to the resources to implement the access actions. The resources may send acknowledgement messages to the central service to confirm that the access actions have been completed.

19 Claims, 7 Drawing Sheets

(56) References Cited

U.S. PATENT DOCUMENTS

| | | | |
|---|---|---|---|
| 2005/0242921 A1* | 11/2005 | Zimmerman | G07C 9/22 340/5.2 |
| 2006/0235851 A1* | 10/2006 | Akachi | H04N 7/15 |
| 2009/0221266 A1* | 9/2009 | Ohta | H04W 12/082 455/411 |
| 2011/0173679 A1* | 7/2011 | Perumal | G06F 21/6218 726/4 |
| 2013/0185774 A1* | 7/2013 | Morelli, Jr. | G06F 21/31 726/4 |
| 2014/0150050 A1* | 5/2014 | Lotem | H04L 63/20 726/1 |
| 2015/0200943 A1* | 7/2015 | Pitre | G06F 21/45 726/1 |
| 2017/0223057 A1* | 8/2017 | Amiri | H04L 63/10 |
| 2020/0028854 A1* | 1/2020 | Fabrizi | G06F 21/604 |

\* cited by examiner

USER ACCESS AND IDENTITY LIFE-CYCLE MANAGEMENT

TECHNICAL FIELD

This disclosure relates generally to user access management, and more specifically to managing access to systems and resources by users or devices.

DESCRIPTION OF RELATED ART

Controlling user access to a variety of resources such as application programs, development tools, servers, and the like, is an important management task. For example, when a new employee joins an organization, the new employee is typically granted access to a wide variety of resources (such as email and other software programs, databases, and servers) of the organization to perform his or her job. Also, when an employee's tenure with the organization comes to a close, the employee's access to such resources is typically revoked in a controlled and accountable manner, for example, to prevent theft or misappropriation of proprietary information of the organization. Each of these resources may have a unique user interface and/or may use different techniques for managing user access. Implementing and managing user access to different company resources may be complicated and burdensome, particularly for organizations employing a large number of people who may have different access privileges and permissions to a wide variety of company resources.

As such, there exists a need for a simplified procedure to manage user access to a number of different company resources.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods and devices of this disclosure each have several innovative aspects, no single one of which is solely responsible for the desirable attributes disclosed herein.

One innovative aspect of the subject matter described in this disclosure can be implemented as a method for managing user access to a plurality of resources of an organization. The method can be performed by one or more processors of an access management system, and can include receiving an access change request message identifying a user and requesting a change in the identified user's access to one or more selected resources of the plurality of resources; transmitting an event message to each of the selected resources, each of the event messages identifying the user and instructing a corresponding one of the selected resources to modify the user's access based on the requested change; and receiving, from each of the selected resources, an event acknowledgement message indicating whether the requested change in the identified user's access was successfully completed. In some aspects, modifying the user access to the corresponding resource may include one or more of granting the user access to the corresponding resource, suspending user access to the corresponding resource for a period of time, modifying the times during which the user is authorized to access the corresponding resource, limiting the user's access to the corresponding resource to a certain duration of time, changing a level of user access to the corresponding resource, changing which portions of the corresponding resource that the user is authorized to access, or revoking the user's access to the corresponding resource.

In some implementations, the access change request message may indicate at least one of a role of the identified user in the organization, a work group of the organization to which the identified user belongs, or a change in the user's role or work group, and the at least one of the role, the work group, or the change in the user's role or work group may be used to identify the selected resources. In addition, or in the alternative, the access change request message may include information indicating a date and/or a time at which the requested change in user access is to be implemented in one or more of the selected resources. In some aspects, the method may also include determining whether the requested change in the identified user's access is completed by the indicated date and/or time, and generating a completion signal or an error signal based on the determining.

Another innovative aspect of the subject matter described in this disclosure can be implemented in an access management system. In some implementations, the access management system may include a plurality of resources associated with an organization, one or more processors, and a memory coupled to the one or more processors. The memory may store instructions that, when executed by the one or more processors, causes the access management system to receive an access change request message identifying a user and requesting a change in the identified user's access to one or more selected resources of the plurality of resources; transmit an event message to each of the selected resources, each of the event messages identifying the user and instructing a corresponding one of the selected resources to modify the user's access based on the requested change; and receive, from each of the selected resources, an event acknowledgement message indicating whether the requested change in the identified user's access was successfully completed. In some aspects, modifying the user access to the corresponding resource may include one or more of granting the user access to the corresponding resource, suspending user access to the corresponding resource for a period of time, modifying the times during which the user is authorized to access the corresponding resource, limiting the user's access to the corresponding resource to a certain duration of time, changing a level of user access to the corresponding resource, changing which portions of the corresponding resource that the user is authorized to access, or revoking the user's access to the corresponding resource.

In some implementations, the access change request message may indicate at least one of a role of the identified user in the organization, a work group of the organization to which the identified user belongs, or a change in the user's role or work group, and the at least one of the role, the work group, or the change in the user's role or work group may be used to identify the selected resources. In addition, or in the alternative, the access change request message may include information indicating a date and/or a time at which the requested change in user access is to be implemented in one or more of the selected resources. In some aspects, In some aspects, execution of the instructions may cause the access management system to determine whether the requested change in the identified user's access is completed by the indicated date and/or time, and to generate a completion signal or an error signal based on the determination.

In one or more implementations, each of the plurality of resources may include an application program interface (API) configured to decode the event message and to implement the requested change in the identified user's access within the corresponding resource, irrespective of a type of user access mechanism or interface utilized by the corresponding resource.

Another innovative aspect of the subject matter described in this disclosure can be implemented in a non-transitory computer-readable storage medium. In some implementations, the non-transitory computer-readable storage medium may store instructions that, when executed by one or more processors of an access management system, manages user access to a plurality of resources of an organization by performing a number of operations. In some aspects, the number of operations may include receiving an access change request message identifying a user and requesting a change in the identified user's access to one or more selected resources of the plurality of resources; transmitting an event message to each of the selected resources, each of the event messages identifying the user and instructing a corresponding one of the selected resources to modify the user's access based on the requested change; and receiving, from each of the selected resources, an event acknowledgement message indicating whether the requested change in the identified user's access was successfully completed. In some aspects, modifying the user access to the corresponding resource may include one or more of granting the user access to the corresponding resource, suspending user access to the corresponding resource for a period of time, modifying the times during which the user is authorized to access the corresponding resource, limiting the user's access to the corresponding resource to a certain duration of time, changing a level of user access to the corresponding resource, changing which portions of the corresponding resource that the user is authorized to access, or revoking the user's access to the corresponding resource.

In some implementations, the access change request message may indicate at least one of a role of the identified user in the organization, a work group of the organization to which the identified user belongs, or a change in the user's role or work group, and the at least one of the role, the work group, or the change in the user's role or work group may be used to identify the selected resources. In addition, or in the alternative, the access change request message may include information indicating a date and/or a time at which the requested change in user access is to be implemented in one or more of the selected resources. In some aspects, execution of the instructions may cause the access management system to determine whether the requested change in the identified user's access is completed by the indicated date and/or time, and to generate a completion signal or an error signal based on the determination.

BRIEF DESCRIPTION OF THE DRAWINGS

Implementations of the subject matter disclosed herein are illustrated by way of example and are not intended to be limited by the figures of the accompanying drawings. Like numbers reference like elements throughout the drawings and specification. Note that the relative dimensions of the following figures may not be drawn to scale.

DETAILED DESCRIPTION

Various implementations relate generally to managing user access to a plurality of resources of an organization. Some implementations more specifically relate to an access management system that can modify user access to a wide variety of resources for a multitude of different users using a single message. In some implementations, the access management system may include a central service that can receive a single access change request message requesting a change in a particular user's access to one or more selected resources of the plurality of resources. The central service may identify the selected resources based on information contained in the access change request message, and may transmit an event message to each of the selected resources. Each event message may identify the user and may instruct a corresponding one of the selected resources to modify the identified user's access based on the requested change. Upon completion of the requested change in user access, each of the selected resources may transmit an event acknowledgement message indicating whether the requested change in user access was successfully completed.

Particular implementations of the subject matter described in this disclosure can be used to simplify managing user access to a plurality of different resources associated with an organization. More specifically, the access management system disclosed herein provides a single point of contact to modify access to any number of the resources for a plurality of different users, irrespective of a type of user access mechanism or interface utilized by each of the resources. In some implementations, aspects of the present disclosure may allow a central service to manage user access to any number of the resources based on a single message received from an administrator (or other authorized user) of the access management system, as compared with conventional systems that may require the administrator to transmit a separate message to each of the selected resources and/or to use a multitude of different user access mechanisms to implement user access changes in the plurality of resources.

Various implementations of the subject matter disclosed herein provide one or more technical solutions to the technical problem of managing user access to a plurality of company resources which may have different user interfaces, may be implemented on different software platforms, and/or may employ different mechanisms for managing user access. More specifically, various aspects of the present disclosure provide a unique computing solution to a unique computing problem that did not exist prior to the availability of a diverse array of electronic or online resources to an organization, much less prior to the need to manage user access for large numbers of employees that may be associated with different roles or work groups within the organization and/or who may have different access rights and privileges. As such, implementations of the subject matter disclosed herein are not an abstract idea such as organizing human activity or a mental process that can be performed in the human mind.

Moreover, various aspects of the present disclosure effect an improvement in the technical field of managing user access to an organization's resources by allowing an administrator (or other authorized user) of an access management system to modify user access to any one or more of a plurality of resources, irrespective of a type of user access mechanism or interface utilized by each of the resources, using a single message in a specific technological way that cannot be performed in the human mind, much less using pen and paper. In addition, implementations of the subject matter disclosed herein do far more than merely create contractual relationships, hedge risks, mitigate settlement risks, and the like, and therefore cannot be considered a fundamental economic practice.

In the following description, numerous specific details are set forth such as examples of specific components, circuits, and processes to provide a thorough understanding of the present disclosure. The term "coupled" as used herein means connected directly to or connected through one or more intervening components or circuits. The terms "processing system" and "processing device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing, and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory, and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may include random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits, and instructions described in connection with the implementations disclosed herein may be executed by one or more processors. The term "processor," as used herein may refer to any general-purpose processor, conventional processor, controller, microcontroller, and/or state machine capable of executing scripts or instructions of one or more software programs stored in memory.

Figure 1:
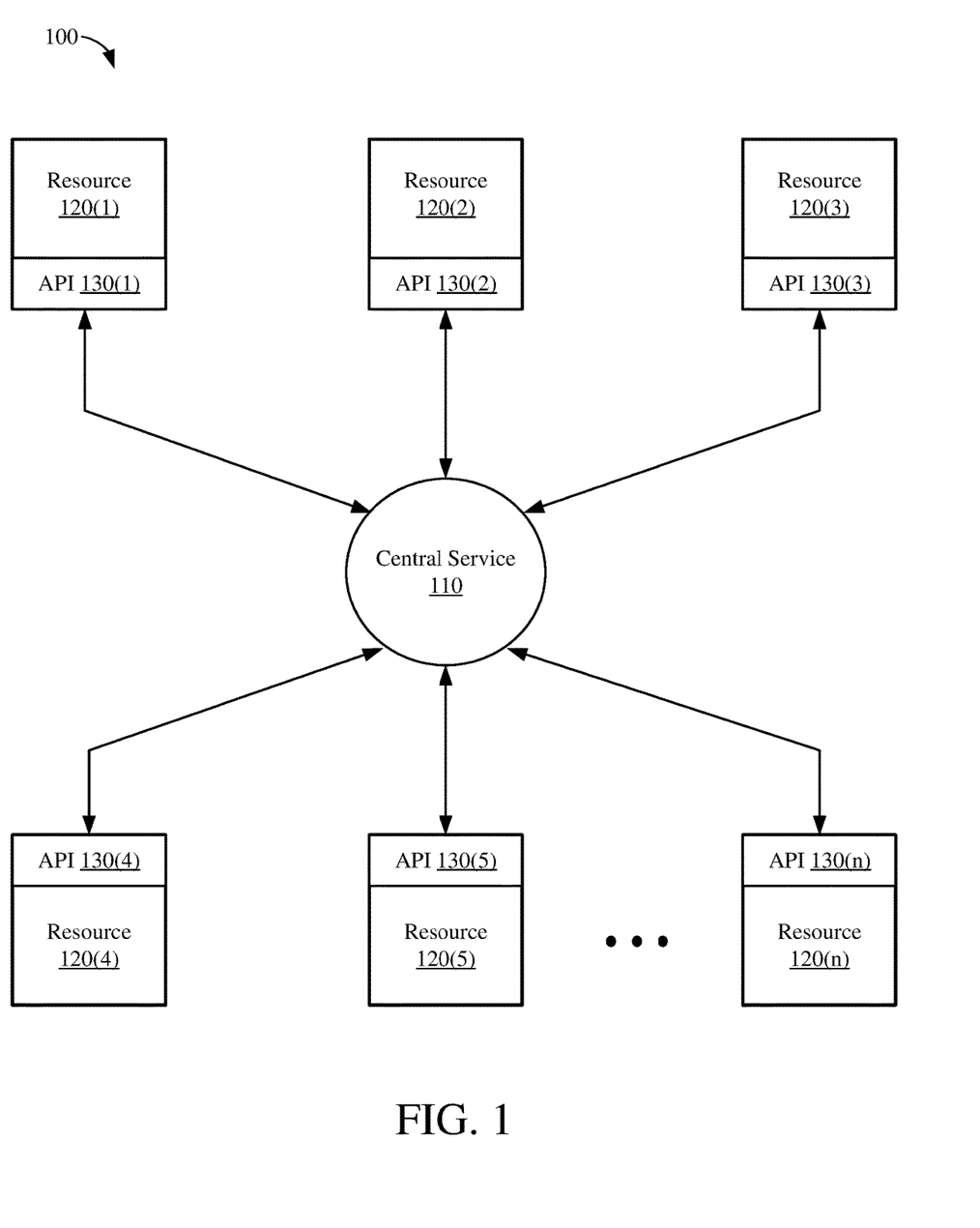
FIG. 1 shows a block diagram of an access management system, according to some implementations.

FIG. 1 shows a block diagram of an example access management system 100, according to some implementations. The access management system 100 includes a central service 110 that may be used to manage the access of each of a number of different users to a plurality of resources 120(1)-120(n) provided by or associated with an organization. The organization may be any suitable entity including, for example, a business entity, a non-profit entity, or a government entity. Each of the number of users may be an employee, a contractor, a visitor, or any other person to which access to one or more of the resources 120(1)-120(n) may be granted, revoked, suspended, or modified by the organization. In some other implementations, one or more of the users may be a device for which access to one or more of the resources 120(1)-120(n) may be granted, revoked, suspended, or modified by the organization. The device may be a smart phone, laptop, tablet computer, Internet of Things (IoT) device, tag, or any other suitable device. For example, the device may be an access card used by a particular employee to gain access to a building, facility, or room of the organization. In some aspects, the access card may be implemented as an IoT device (which typically communicates with other devices using Bluetooth Low Energy (BLE) signals). In other aspects, the access card may be implemented as a tag (which typically communicates with other devices using a near-field communication (NFC) protocol).

Each of the plurality of resources 120(1)-120(n) may be or may include any suitable resource or service that can be accessed, used, or controlled by one or more of the number of users. In some implementations, the plurality of resources 120(1)-120(n) may include computing devices, data storage resources, application programs, physical access control systems, and other resources or services available to users with access authorized by the organization. The computing devices may include (but are not limited to) personal computers, laptops, mobile computing devices, workstations, servers, and cloud-based computing resources associated with or managed by the organization. The data storage resources may include (but are not limited to) on-site data storage systems and cloud-based storage systems associated with or managed by the organization. The application programs may include (but are not limited to) email programs or systems, messaging programs or systems, productivity software programs (such as Microsoft® Word and Excel), financial software programs (such as Intuit® Quickbooks), customer relationship software programs (such as various offerings from Salesforce® and Oracle®), source code management applications, and any other software program or application made available to users associated with the organization. The physical access control systems may include (but are not limited to) building entry systems, door or room access systems, elevator access systems, and the like.

Although described herein in the context of managing a user's access to resources associated with an organization, the access management system 100 may be used to manage access to any feasible resource by any feasible user or device. For example, in some other implementations, the user may be a mobile computing device (such as a smart phone or an IoT device), and the resources 120(1)-120(n) may include location-based services, retail services, wired or wireless networks, and so on.

In some implementations, the central service 110 may grant, suspend, modify, or revoke individual user access to one or more of the resources 120(1)-120(n) based on receiving an access change request message from an administrator or other person authorized by the organization to manage user access to the resources 120(1)-120(n). In some aspects, the central service 110 may be located on-site, and the access change request message may be electronically transmitted to the central service 110 from a local interface (such as an on-site computing device), from a remote interface (such as a computing device communicating with the central service 110 via an external network), or both. In other aspects, the central service 110 may be located off-site, for example, and implemented in a data center or as a cloud-based software service.

Upon receiving the access change request message, the central service 110 may send an event message to each of a number of the resources 120(1)-120(n) selected or identified by the access change request message. Each event message may include instructions to change (such as grant, suspend, modify, or revoke) access to a corresponding one of the selected resources for a particular user (or for a group of users). In addition, or in the alternative, each event message may include instructions to change a level of user access to the corresponding resource, to change which portions of the corresponding resource that the user is authorized to access, to change the times during which the user is authorized to access the corresponding resource, and/or to limit the user's access to the corresponding resource to a certain duration of time.

The instructions to change the level of user access may be based on any suitable factors or conditions including, for example, a change in the user's role or job within the organization. In some aspects, the user may have transitioned from an independent contractor to a full-time employee, and may need or be authorized for greater access to one or more of the resources 120(1)-120(n). Conversely, the user may have transitioned from a full-time employee to an independent contractor, and may be given less or restricted access to one or more of the resources 120(1)-120(n).

The instructions to change the times during which the user is authorized to access the organization's resources may also be based on any suitable factors or conditions. For one example, if the user is an independent contractor, then it may be desirable to limit the user's access to one or more of the resources 120(1)-120(n) to regular business hours (such as between 9 am and 5 pm Monday through Friday). Conversely, if the user is a full-time employee and/or has a certain security clearance, then the user may be granted access to the one or more of the resources 120(1)-120(n) at all times (or with some temporal restrictions). Similarly, the instructions to limit the user's access to the organization's resources to a certain duration of time may be based on any suitable factors or conditions. For example, some users may be allowed to access certain resources for no more than one hour at a time (or other suitable time limit), and may be allowed to access other resources without any time limits. Various other configurations may become apparent after reading this disclosure, and therefore an exhaustive list is not provided herein for brevity.

In some implementations, modifying the user access may include one or more of granting the user access to a corresponding resource, suspending user access to the corresponding resource for a period of time, modifying the times during which the user is authorized to access the corresponding resource, limiting the user's access to the corresponding resource to a certain duration of time, changing a level of user access to the corresponding resource, changing which portions of the corresponding resource that the user is authorized to access, or revoking the user's access to the corresponding resource. The resources of the plurality of resources 120(1)-120(n) that are not selected for modifying user access may not receive an event message from the central service 110. In other words, the central service 110 transmits event messages only to the resources for which the access change request message includes instructions to modify the particular user's access.

Each of the resources 120(1)-120(n) that receives an event message from the central service 110 may modify user access according to the information contained therein, and may send an event acknowledgement message to the central service 110 confirming that the requested user access changes were successfully implemented. If a respective one of the resources 120(1)-120(n) is unable to implement the requested user access changes, the respective resource may send an event acknowledgement message indicating that the requested user access changes were not implemented. In addition, or in the alternative, if the respective resource is unable to implement the requested user access changes and also unable to send the event acknowledgement message (such as because the resource is being updated, replaced, or otherwise taken off-line when the event message was transmitted), the central service 110 may flag the respective resource for one or more subsequent actions.

In many instances, the resources 120(1)-120(n) may be provided by different entities and/or may employ different mechanisms for managing user access. As a result, the user access mechanisms employed by some or all of the resources 120(1)-120(n) may not be compatible with each other. To ensure compatibility with the central service 110, each of the resources 120(1)-120(n) may include an application program interface (API) 130 that is configured to decode the event message and implement the requested user access changes in the corresponding resource, irrespective of a type of user access mechanism or interface utilized by the corresponding resource. In some implementations, each of the APIs 130(1)-130(n) may be customized for a respective one of the resources 120(1)-120(n), for example, to allow the central service 110 to control or manage user access to a wide variety of resources that may be provided or managed by different entities and/or that may employ different mechanisms for managing user access. In some aspects, the APIs 130(1)-130(n) may be configured to store multiple messages sent from the central service 110 and to respond to the stored messages at different times or in different orders.

The access management system 100 may simplify user access management by allowing the central service 110 to serve as a single point of contact to modify access to any number of the resources 120(1)-120(n) for a plurality of different users or for a multitude of different user groups. The APIs 130(1)-130(n) associated with the resources 120(1)-120(n) may allow the central service 110 to communicate user access change requests to the resources 120(1)-120(n), irrespective of a type of user access mechanism or interface utilized by each of the resources 120(1)-120(n). In addition, aspects of the present disclosure may allow the central service 110 to manage a user's access to any number of the resources 120(1)-120(n) based on a single access change request message, rather than sending separate request messages to each of the resources 120(1)-120(n), as described below.

Figure 2:
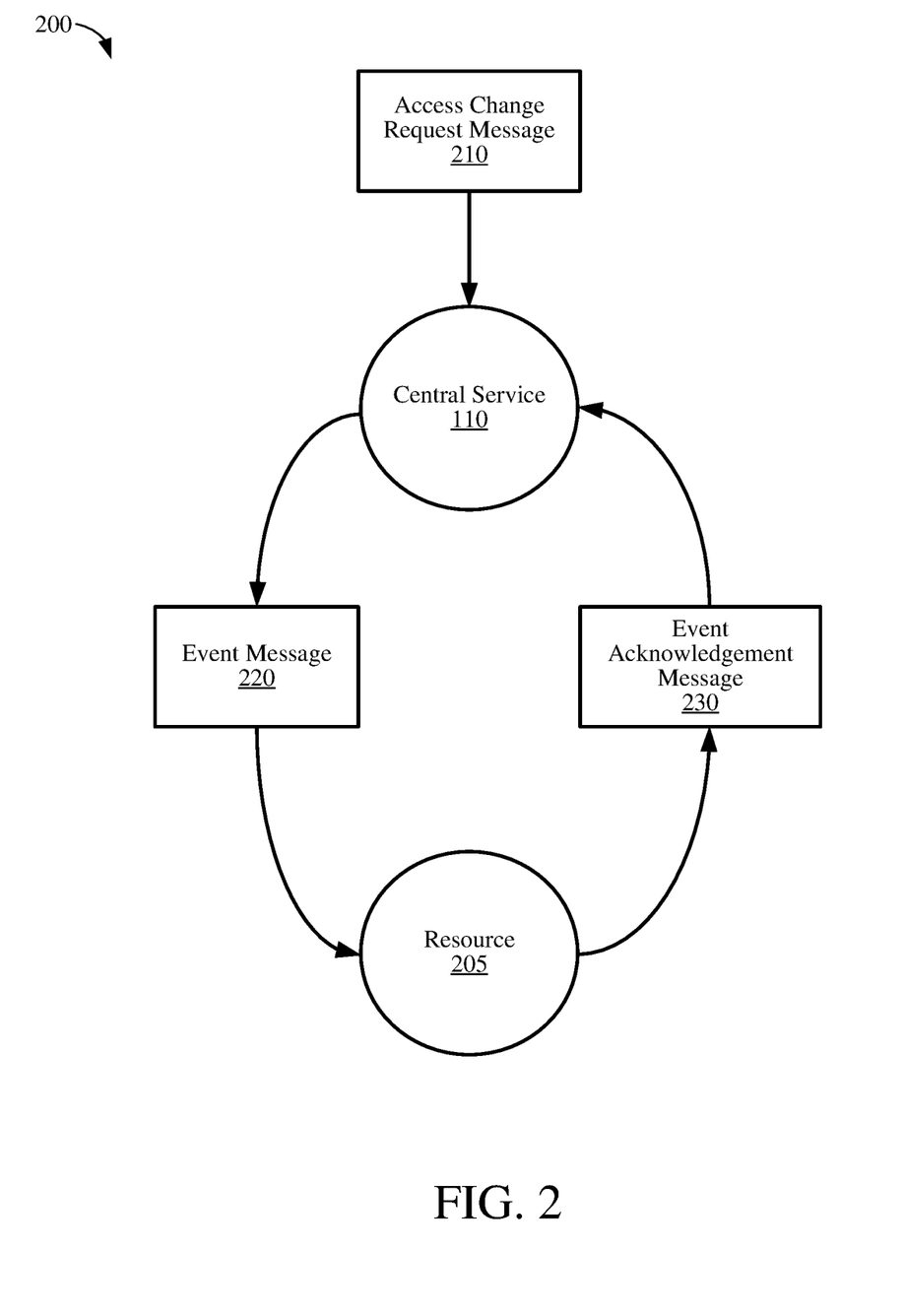
FIG. 2 shows a flow diagram depicting an example operation for modifying a user's access to resources of the access management system of FIG. 1.

FIG. 2 shows a flow diagram depicting an example operation 200 for modifying a user's access to resources of the access management system of FIG. 1. The resource 205 shown in FIG. 2 may be (or may correspond to) one or more of the resources 120(1)-120(n) of FIG. 1. For simplicity, the API associated with the resource 205 is not shown in FIG. 2. As discussed above, the central service 110 may receive an access change request message 210 containing instructions to modify user access to the resource 205. In some implementations, the access change request message 210 may identify a particular user associated with the access change request, may identify which of the resources 120(1)-120(n) are to be selected for the access change request, may indicate the type of access change requested, and/or may indicate a particular time at which the access change is to be implemented.

Figure 3:
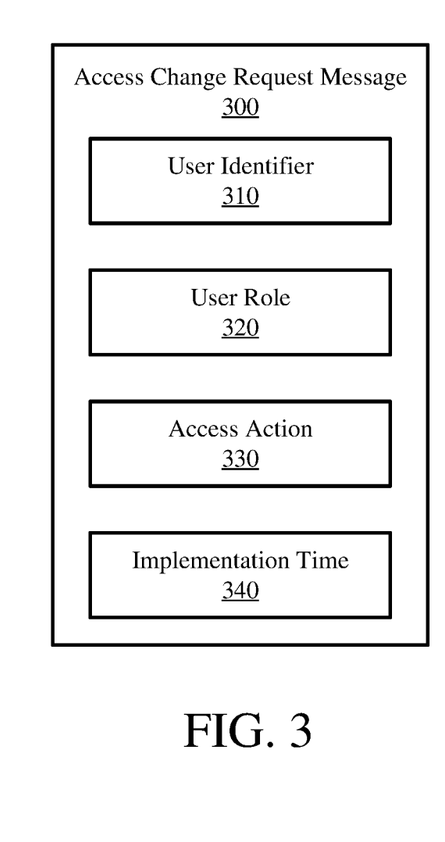
FIG. 3 shows an example access change request message, according to some implementations.

For example, FIG. 3 shows an example access change request message 300, according to some implementations. The access change request message 300, which may be one example of the access change request message 210 of FIG. 2, is shown to include a user identifier field 310, a user role field 320, an access action field 330, and an implementation time field 340. In other implementations, the access change request message 300 may include additional or fewer fields. The user identifier field 310 may contain any suitable information that uniquely identifies a user for whom access to one or more of the resources 120(1)-120(n) is to be modified. For example, the user identifier field 310 may include (but is not limited to) the user's full name, the user's partial name, the user's nickname, the user's employee number, the user's social security number (SSN), the user's login ID or user ID, or any other feasible identifier that may be used to identify the user.

The user role field 320 may include information identifying one or more roles, duties, or work groups associated with the user indicated by the user identifier 310. In some implementations, the user role field 320 may indicate that the user is a member of a particular department, division, or team within the organization (such as accounting, finance, marketing, sales, engineering, human resources, facilities management, and so on). In addition, or in the alternative, the user role field 320 may indicate the title (such as president, vice president, general counsel, director of sales, human resources manager, and so on) of the user.

The access action field 330 may include information indicating the specific change in user access requested by the access change request message 210. In some implementations, the specific change in user access may include (but is not limited to) granting the user access to the resource 205, denying the user's access to the resource 205, revoking the user's access to the resource 205, modifying the user's level of access to the resource 205, and any other feasible change in the user's access to the resource 205.

The implementation time field 340 may include information indicating a date and/or a time at which the requested change in user access is to be implemented for the resource 205. The ability to select the time at which user access is modified in the resource 205 allows user access change requests 300 to be delivered at any time prior to the selected time for performing the user access change. For example, an administrator of the access management system 100 of FIG. 1 may send an access change request message 300 to the central service 110 on Friday to request access to the resource 205 for a new employee that begins employment on the following Monday. In one or more aspects, the implementation time field 340 may also indicate a date and/or time prior to which no action relating to the requested user access change is to be taken.

Referring again to FIG. 2, the central service 110 may receive the access change request message 210, decode the information contained therein, and send an event message 220 to the resource 205. The event message 220 may contain instructions to modify user access to the resource 205 based on information contained in the access change request message 210. Referring also to FIG. 1, the central service 110 may also send an event message 220 to each of the resources 120(1)-120(n) identified in the access change request message 210 or associated with the user identified in the access change request message 210. In some implementations, the central service 110 may use information contained in the user role field 320 to determine which, if any, of the resources 120(1)-120(n) are affected based on the user's role. For one example, if the user is associated with a financial role, then the user may need access to financial databases, as well as access to a default group of software programs (such as email, messaging, word processing, spreadsheets), and various physical access control resources (such as badge-controlled doors). For another example, if the user is associated with an engineering role, then the user may need access to a source code repository resource, as well as access to the default group of software programs and various physical access control resources. In this manner, the central service 110 can send the event message 220 to each of the resources 120(1)-120(n) associated with the user's role or position within the organization.

Figure 4:
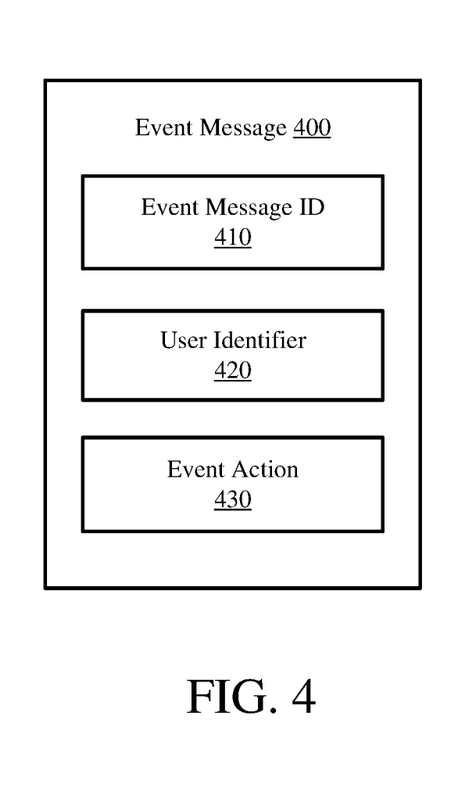
FIG. 4 shows an example event message, according to some implementations.

For example, FIG. 4 shows an example event message 400, according to some implementations. The event message 400, which may be one example of the event message 220 of FIG. 2, is shown to include an event message ID field 410, a user identifier field 420, and an event action field 430. In other implementations, the event message 400 may include additional or fewer fields. The event message ID field 410 may store a unique message number that can be used by the central service 110 to monitor and track user access operations associated with the event message 400.

The user identifier field 420 may contain any suitable information that uniquely identifies the user for whom access to one or more of the resources 120(1)-120(n) is to be modified. For example, the user identifier field 420 may include (but is not limited to) be the user's full name, the user's partial name, the user's nickname, the user's employee number, the user's login ID or user ID, or any other feasible identifier that may be used to identify the user. In some implementations, the user identifier field 420 may contain the same (or at least similar) information as the user identifier field 310 of the access change request message 300 of FIG. 3.

The event action field 430 may include information describing actions to be taken relating to user access to the resource 205. In some implementations, the event action field 430 may contain the same (or at least similar) information as the access action field 330 of the access change request message 300. For one example, the event action field 430 may contain instructions to grant user access to the resource 205 at the time or date indicated in the access change request message 300. For another example, the event action field 430 may contain instructions to revoke user access to the resource 205 at the time or date indicated in the access change request message 300. For yet another example, the event action field 430 may contain instructions to modify user access (such as to restrict the user from accessing certain portions of the resource 205). Other event actions are possible, but are not listed for simplicity.

Referring again to FIG. 2, the API associated with the resource 205 may receive the event message 220, decode or retrieve information contained therein, and modify user access to the resource 205 accordingly. Thereafter, the resource 205 may send an event acknowledgement message 230 to the central service 110. The event acknowledgement message 230 may include event status information indicating whether the access change associated with the event message 220 was successfully completed. The event acknowledgement message 240 may be sent after completion of the access change associated with the event message 230, or in response to another message, such as a status check message, from the central service 110. In some implementations, the event acknowledgement message 240 may include an event ID that link the event acknowledgement message 230 to the corresponding event message 220.

Figure 5:
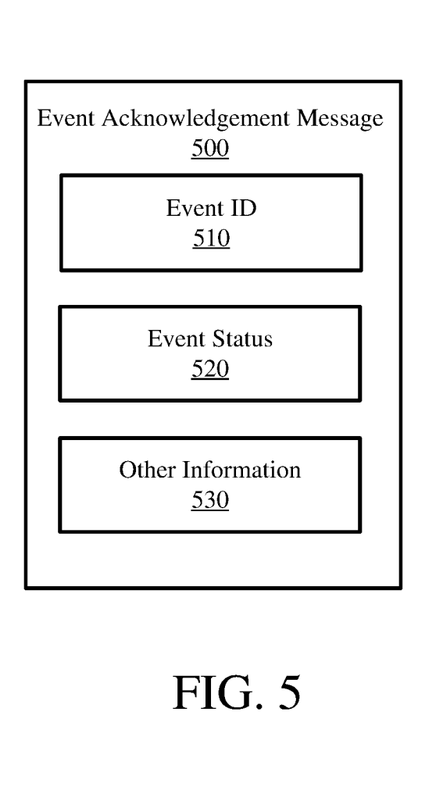
FIG. 5 shows an example event acknowledgement message, according to some implementations.

For example, FIG. 5 shows an example event acknowledgement message 500, according to some implementations. The event acknowledgement message 500, which may be one example of the event acknowledgement message 230 of FIG. 2, is shown to include an event ID field 510, an event status field 520, and an additional information field 530. In other implementations, the event acknowledgement message 500 may include additional or fewer fields.

The event ID field 510 may store information identifying the event message 220 that requested user access changes confirmed by the event acknowledgement message 500. For example, if a previous event message 220 has an event message ID of "XYZ," then an event acknowledgement message 500 containing the value "XYZ" in the event ID field 510 may provide status information associated with user access changes requested by that previous event message 220. The other information field 530 may be used to store additional information relating to the completion or incompletion of one or more requested user access changes.

The event status field 520 may indicate whether the event associated with the event ID was completed or was not completed. For example, a previous event message 400 may have requested a change to a user's access. If the access change was successful, then the event status field 520 may indicate that the event associated with the previous event message 400 was successfully completed. On the other hand, if the access change was not successful, then the event status field 520 may indicate that the event associated with the previous event message 400 was not successfully completed. In this manner, the central service 110 may determine the success or failure of requested access changes based on information contained in the event acknowledgement message 500. In some implementations, the success or failure of the access change request may be recorded (logged) and reported out by the central service 110.

As discussed above, a resource 120 that received an event message 220 may not be able to implement the requested user access changes and may not be able to transmit an event acknowledgement message 230 to the central service 110 for a variety of reasons. For one example, the resource 120 may not be able to transmit an event acknowledgement message 230 because the resource 120 was being serviced, upgraded, or replaced when the event message 220 was transmitted from the central service 110. For another example, the resource 120 may not be able to transmit an event acknowledgement message 230 because of a power outage or a disabled communication link. To ensure that the user access changes requested by a given event message 220 are implemented in the resource 120, the central service 110 may flag the resource 120 for one or more subsequent actions (such as re-transmitting the given event message 220 to the resource 120) if an event acknowledgement message 230 corresponding to the given event message 220 is not received within a certain time period after transmission of the event message 220 to the resource 120. In some implementations, the central service 110 may maintain, for each of the resources 120(1)-120(n), an acknowledgement table indicating whether an event acknowledgement message 230 was received for each event message 220 sent to the corresponding resource 120. In some aspects, the central service 110 may map information contained in the event ID field 510 of each received event acknowledgement message 500 to the event message IDs of event messages 220 sent to the resource 120 to determine which (if any) user access change requests were not acknowledged by the resource 120.

In the examples above, the access management system 100 is described in the context of managing a user's access to resources within a corporate (e.g., an enterprise) environment. In other implementations, the access management system 100 may be used to manage the access of any feasible resource by any feasible user. For example, the "user" may be a mobile device such as a smart phone or an Internet of Things (IoT) device and the "resources" may be location-based services such as retail services or wireless network connections.

Figure 6:
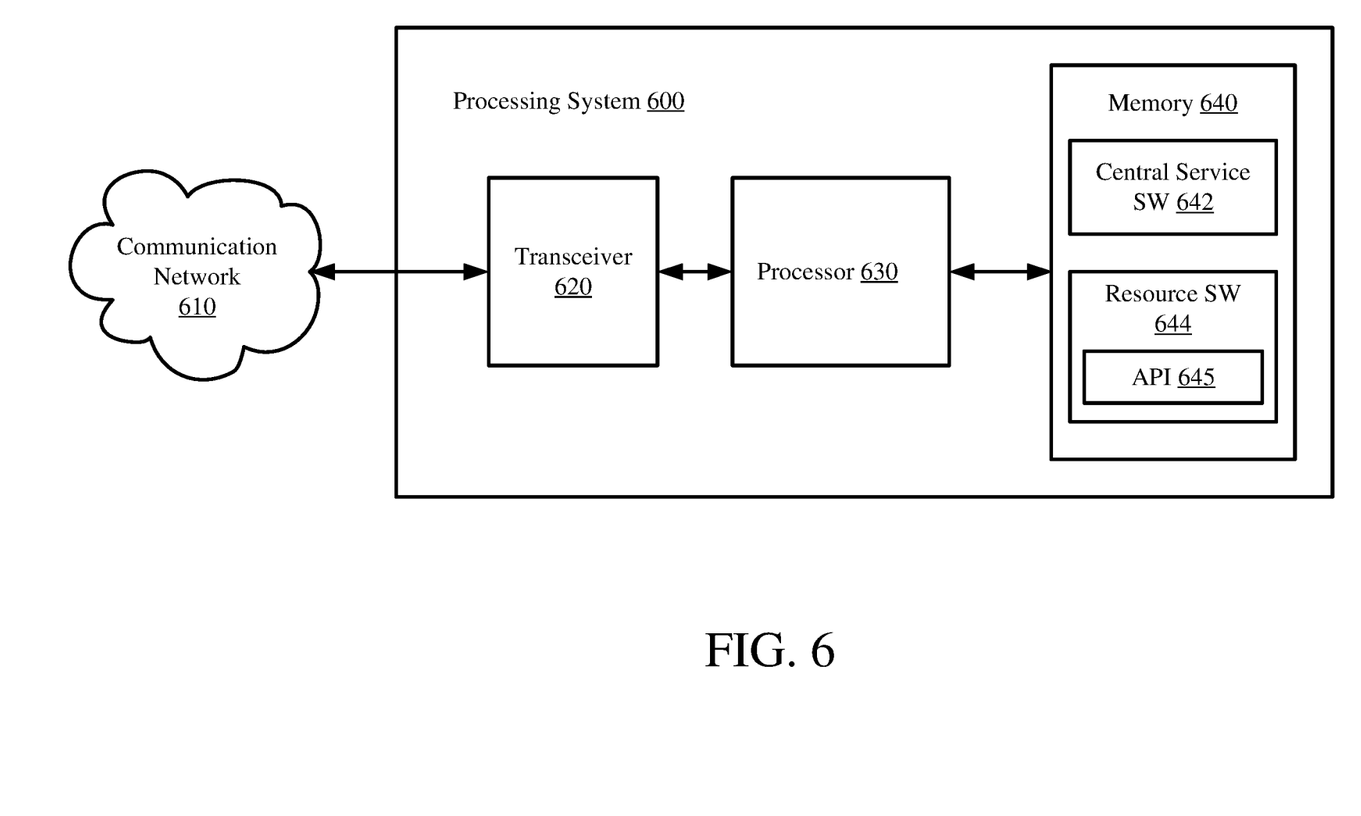
FIG. 6 shows a block diagram of an example processing system, according to some implementations.

FIG. 6 is a block diagram of an example processing system 600. The processing system 600 may include a transceiver 620, a processor 630, and a memory 640. The transceiver 620 may be coupled to a communication network 610 and may transmit and receive messages, including the access change request messages 300 of FIG. 3, the event messages 400 of FIG. 4, and the event acknowledgement messages 500 of FIG. 5. In some implementations, the example processing system 600 may represent (or may be contained within or associated with) the central service 110 of FIG. 1. In other implementations, the example processing system 600 may represent (or may be contained within or associated with) one or more of the resources 120(1)-120(n) of FIG. 1.

The memory 640 may include a non-transitory computer-readable storage medium (e.g., one or more nonvolatile memory elements, such as EPROM, EEPROM, Flash memory, a hard drive, etc.) that may store the following software modules:
 a central service software (SW) module 642 to receive access change request messages, to transmit event messages, and to receive event acknowledgement messages; and
 a resource SW module 644 to receive event messages and to transmit event acknowledgement messages.
Each software module includes program instructions that, when executed by the processor 630, may cause the processing system 600 to perform the corresponding function(s). Thus, the non-transitory computer-readable storage medium of the memory 640 may include instructions for performing all or a portion of the operations of FIG. 7 and/or FIG. 10.

The processor 630, which may be coupled to the transceiver 620 and the memory 640, may be any one or more suitable controllers, processors, state machines or the like capable of executing scripts or instructions of one or more software programs stored in the processing system 600 (e.g., within the memory 640). In some implementations, the processor 630 may be implemented with a hardware controller, a processor, a state machine, or other circuits to provide the functionality of the processor 630 executing instructions stored in the memory 640.

The processor 630 may execute the central service SW module 642 to perform one or more functions associated with the central service 110 of FIG. 2. In some implementations, the processor 630 may execute the central service SW module 642 to receive and review one or more access change request messages 300. Based on contents of the access change request message 300, the processor 630 may execute the central service SW module 642 to generate and transmit one or more event messages 400. Further, in some implementations, the processor 630 may execute the central service SW module 642 to receive one or more event acknowledgement messages 500.

The processor 630 may execute the resource SW module 644 to perform one or more functions associated with the resource 210 of FIG. 2. In some implementations, the processor 630 may execute the resource SW module 644 to receive one or more event messages 400, perform any access changes indicated in the event messages 400, and transmit one or more event acknowledgement messages 500. In some implementations, the resource SW module 644 may include an optional API 645 to interface between actions described in the event message 400 and any other software or hardware modules associated with the processing system 600 (software and hardware modules not shown for simplicity).

Although the memory 640 is shown to include both a central service SW module 642 and a resource SW module 644, in other implementations, the memory 640 may include only one of the two SW modules. In some other implementations, the processor 630 may simply execute one of the two SW modules. For example, if the processing system 600 is only to function as a central service 110, then the processor 630 may simply execute the central service SW module 642, and the processor 630 may not execute the resource SW module 644 module. In some cases, the resource SW module 644 may be omitted from the memory 640. In a similar manner, if the processing system 600 is only to function as a resource 210, then the processor 630 may simply execute the resource SW module 644 and not execute the central service SW module 642. In some cases, the central service SW module 642 may be omitted from the memory 640.

Figure 7:
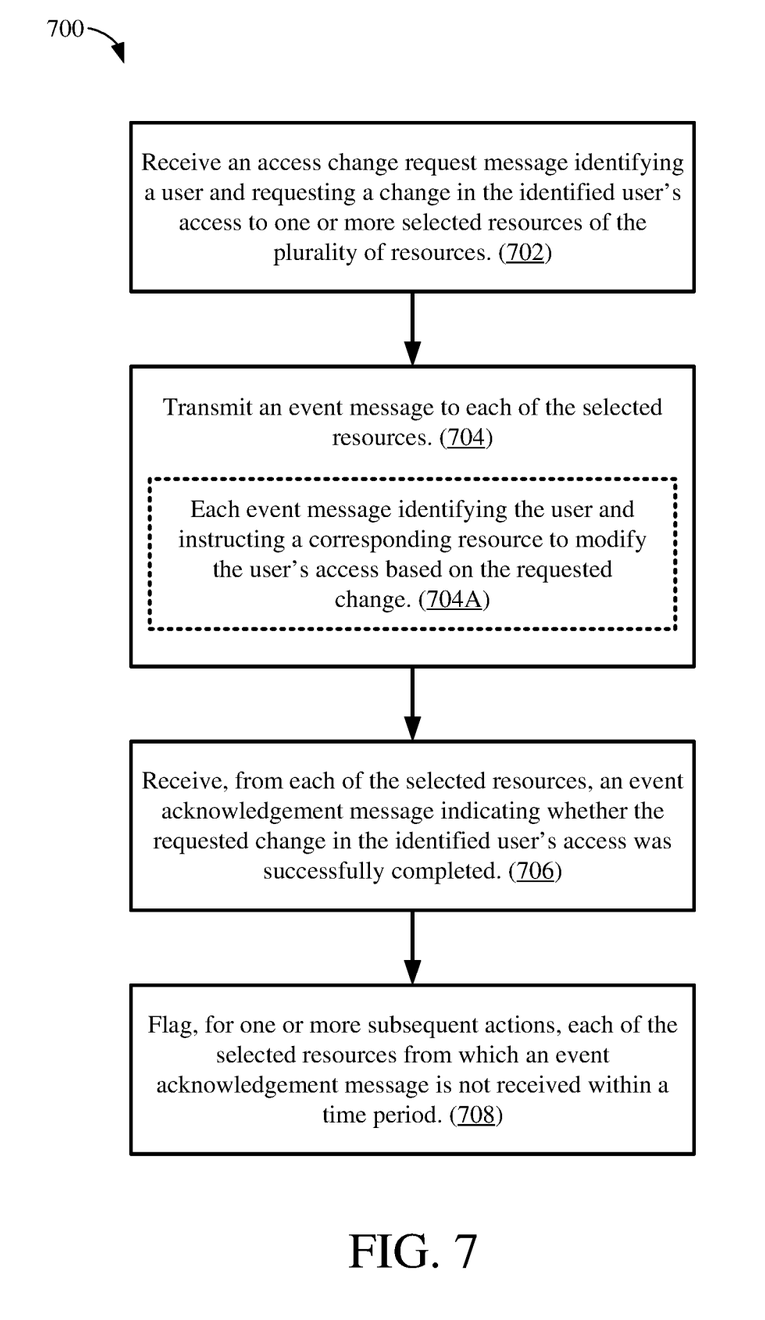
FIG. 7 shows an illustrative flow chart depicting an example operation for managing user access to a plurality of resources associated with an organization, according to some implementations.

FIG. 7 shows an illustrative flow chart depicting an example operation 700 for managing user access to a plurality of resources associated with an organization. In some implementations, the example operation 700 may be performed by the central service 110 of the access management system 100 to manage user access to the plurality of resources 120(1)-120(n) of FIG. 1. In other implementations, the example operation 700 may be performed by another suitable device, system, or apparatus to manage user access to a number of resources that may be provided by different entities and/or that may employ different mechanisms for managing user access.

The central service 110 may receive an access change request message identifying a user and requesting a change in the identified user's access to one or more selected resources of the plurality of resources (702). In some implementations, the access change request message may be an example of the access change request message 300 of FIG. 3, and may indicate at least one of a role of the identified user in the organization, a work group of the organization to which the identified user belongs, or a change in the user's role or work group. In some aspects, the at least one of the role, the work group, or the change in the user's role or work group contained in the access change request message may be used to identify the one or more selected resources for which the user access is to be modified.

The central service 110 may transmit an event message to each of the selected resources (704). In some implementations, each event message may be an example of the event message 400 of FIG. 4, and may cause the modification of the identified user's access to the corresponding resource based on the requested change in user access (704A). In some aspects, modification of the user access may include one or more of granting the user access to the corresponding resource, suspending user access to the corresponding resource for a period of time, modifying the times during which the user is authorized to access the corresponding resource, limiting the user's access to the corresponding resource to a certain duration of time, changing a level of user access to the corresponding resource, changing which portions of the corresponding resource that the user is authorized to access, or revoking the user's access to the corresponding resource.

The central service 110 may receive, from each of the selected resources, an event acknowledgement message indicating whether the requested change in the identified user's access was successfully completed (706). In some implementations, each event acknowledgement message may be an example of the event acknowledgement message 500 of FIG. 5, and may include an event ID identifying the corresponding event message 220 which requested the user access changes to the corresponding one of the selected resources. In some aspects, the event acknowledgement message may be transmitted from a respective one of the selected resources upon completion of the requested user access change. In other aspects, the event acknowledgement message may be transmitted from a respective one of the selected resources a predetermined time period after receiving the event message. In some other aspects, the event acknowledgement message may be transmitted from a respective one of the selected resources a predetermined time period after completion of the requested user access change.

In some implementations, the central service 110 may flag, for one or more subsequent actions, each of the selected resources from which an event acknowledgement message is not received within a time period (708). As discussed above, a resource may not be able to send an event acknowledgement message 230 for a number of reasons including, for example, a power outage, loss of a communication link, unavailability of the resource due to serving or upgrading, or due to replacement of the resource. In some aspects, the central service 110 may re-transmit the corresponding event message 220 to the flagged resource one or more times.

Referring again to FIG. 1, one or more of the users may be a device for which access to one or more of the resources 120(1)-120(n) may be granted, revoked, suspended, or modified by the organization. The device may be a smart phone, laptop, tablet computer, IoT device, NFC tag, or any other suitable device. For one example, the device may be an access card used by a particular employee to gain access to a building, facility, or room of the organization. For another example, the device may be a mobile computing device (such as a smart phone, laptop, or tablet computer) through which the particular employee may access one or more of the resources 120(1)-120(n) of FIG. 1. For instances in which user access change requests pertain to a device (rather than a person), the access change request message 210 and the event message 220 may be modified.

Figure 8:
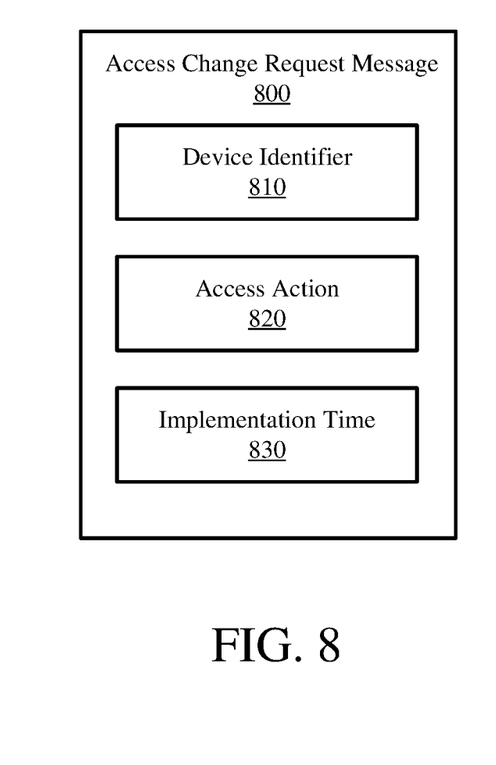
FIG. 8 shows an example access change request message, according to other implementations.

For example, FIG. 8 shows an example access change request message 800, according to other implementations. The access change request message 800, which may be another example of the access change request message 210 of FIG. 2, is shown to include a device identifier field 810, an access action field 820, and an implementation time field 830. In other implementations, the access change request message 800 may include additional or fewer fields. The device identifier field 810 may contain any suitable information that uniquely identifies a device for which access to one or more of the resources 120(1)-120(n) is to be modified. For example, the device identifier field 810 may include (but is not limited to) the device's MAC address, serial number, company label, and the like.

The access action field 820 may include information indicating the specific change in user access requested by the access change request message 800. In some implementations, the specific change in user access may include (but is not limited to) granting the device access to a resource, denying the device access to the resource, revoking the device's access to the resource, modifying the device's level of access to the resource, and any other feasible change in the device's access to the resource.

The implementation time field 830 may include information indicating a date and/or a time at which the requested change in user access is to be implemented in the resource for the device. The ability to select the time at which user access is modified in the resource allows user access change requests 800 to be delivered at any time prior to the selected time for performing the user access change. In one or more aspects, the implementation time field 830 may also indicate a date and/or time prior to which no action relating to the requested user access change is to be taken.

Figure 9:
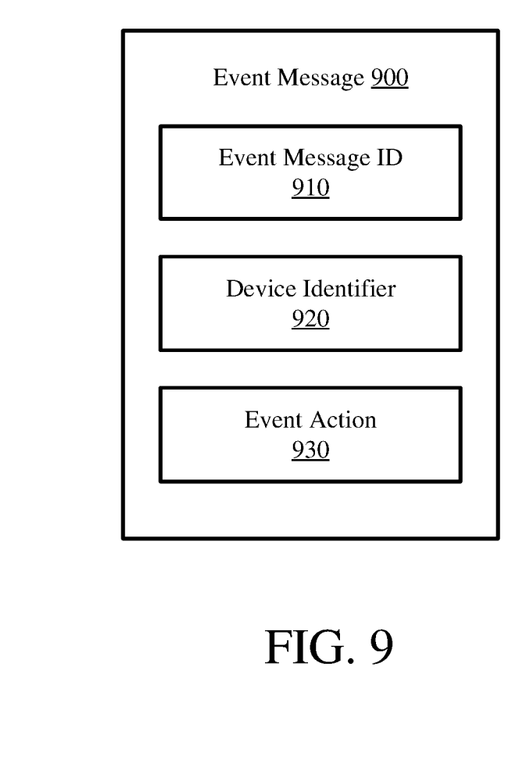
FIG. 9 shows an example event message, according to other implementations.

FIG. 9 shows an example event message 900, according to other implementations. The event message 900, which may be another example of the event message 220 of FIG. 2, is shown to include an event message ID field 910, a user identifier field 920, and an event action field 930. In other implementations, the event message 900 may include additional or fewer fields. The event message ID field 910 may store a unique message number that can be used by the central service 110 to monitor and track user access operations associated with the event message 900.

The device identifier field 920 may contain any suitable information that uniquely identifies the device for which access to one or more of the resources 120(1)-120(n) is to be modified. For example, the device identifier field 920 may include (but is not limited to) the device's MAC address, serial number, company label, and the like. In some implementations, the device identifier field 920 may contain the same (or at least similar) information as the device identifier field 810 of the access change request message 800 of FIG. 8. The event action field 930 may include information describing actions to be taken relating to access to the resource. In some implementations, the event action field 930 may contain the same (or at least similar) information as the access action field 820 of the access change request message 800.

Figure 10:
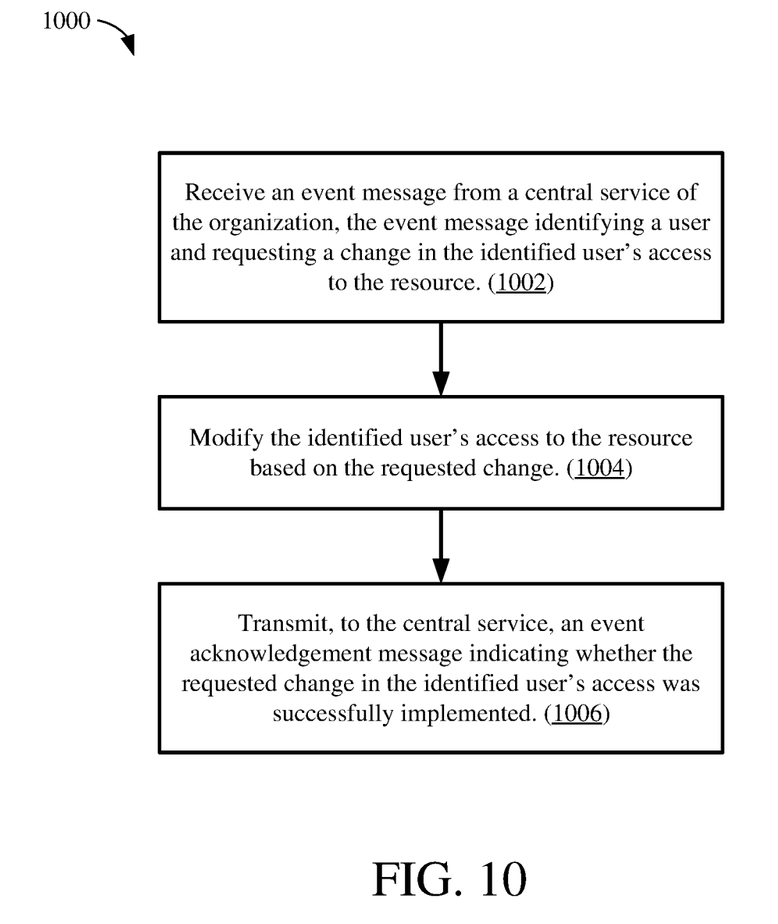
FIG. 10 shows an illustrative flow chart depicting an example operation for managing user access to a resource associated with an organization, according to other implementations.

FIG. 10 shows an illustrative flow chart depicting an example operation 1000 for managing user access to a resource associated with an organization, according to other implementations. In some implementations, the example operation 1000 may be performed by any one or more of the resources 120(1)-120(n) of FIG. 1. In other implementations, the example operation 1000 may be performed by another suitable device, system, or apparatus associated with the any one or more of the resources 120(1)-120(n) of FIG. 1.

The resource 120 may receive an event message from a central service of the organization, the event message identifying a user and requesting a change in the identified user's access to the resource (1002). In some implementations, the event message may be an example of the event message 800 of FIG. 8, and may indicate at least one of a role of the identified user in the organization, a work group of the organization to which the identified user belongs, or a change in the user's role or work group. In some aspects, the at least one of the role, the work group, or the change in the user's role or work group may be used to identify the resource for which the user access is to be modified.

The resource 120 may modify the identified user's access to the resource based on the requested change (1004). In some implementations, modification of the user access may include one of granting the user access to the corresponding one of the selected resources, changing a level of user access to the corresponding one of the selected resources, changing which portions of the corresponding one of the selected resources that the user is authorized to access, or revoking the user's access to the corresponding one of the selected resources.

The resource 120 may transmit, to the central service, an event acknowledgement message indicating whether the requested change in the identified user's access was successfully implemented (1006). In some implementations, the event acknowledgement message may be an example of the event acknowledgement message 900 of FIG. 9, and may include an event ID identifying the corresponding event message 800 which requested the user access changes to the resource. In some aspects, the event acknowledgement message may be transmitted from the resource upon completion of the requested user access change. In other aspects, the event acknowledgement message may be transmitted from the resource a predetermined time period after receiving the event message. In some other aspects, the event acknowledgement message may be transmitted from the resource a predetermined time period after completion of the requested user access change.

In some implementations, the example operation 1000 may be described as:
1. A method for managing user access to a resource of an organization, the method performed by one or more processors of the resource and comprising:
receiving an event message from a central service of the organization, the event message identifying a user and requesting a change in the identified user's access to the resource;
modifying the identified user's access to the resource based on the requested change; and
transmitting, to the central service, an event acknowledgement message indicating whether the requested change in the identified user's access was successfully implemented.
2. The method of claim 1, wherein:
the event message indicates at least one of a role of the identified user in the organization, a work group of the organization to which the identified user belongs, or a change in the user's role or work group; and
the at least one of the role, the work group, or the change in the user's role or work group identifies the resource.
3. The method of claim 1, wherein modifying the user access includes one or more of granting the user access to the resource, suspending user access to the resource for a period of time, modifying the times during which the user is authorized to access the resource, limiting the user's access to the resource to a certain duration of time, changing a level of user access to the resource, changing which portions of the resource that the user is authorized to access, or revoking the user's access to the resource.
4. The method of claim 1, wherein the event message indicates a date and/or a time at which the requested change in the identified user's access is to be implemented in the resource.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method for managing user access to a plurality of resources of an organization, the method performed by one or more processors of an access management system and comprising:
receiving an access change request message identifying an associated user and requesting a change in the identified associated user's access to one or more selected resources of the plurality of resources, wherein the associated user is a person or a device;
transmitting an event message to each respective selected resource of the selected resources, each of the event messages identifying the associated user and instructing the respective selected resource to modify the associated user's access based on the requested change, wherein modifying the associated user's access to the respective selected resource includes at least one of granting, revoking, suspending, or modifying the associated user's access to the respective selected resource for a period of time; and
receiving, from each respective selected resource of the selected resources, an event acknowledgement message indicating whether the requested change in the associated user's access was successfully completed, wherein the event acknowledgement message and its corresponding access change request message are modified if the associated user is a device, and wherein the event acknowledgement message and its corresponding access change request message are not modified if the associated user is a person.

2. The method of claim 1, wherein, if the associated user is a person:
the access change request message indicates at least one of a role of the associated user in the organization, a work group of the organization to which the associated user belongs, or a change in the associated user's role or work group; and
the at least one of the role, work group, or change identifies the respective selected resource.

3. The method of claim 1, wherein the corresponding access change request message includes information indicating a date and/or a time at which the requested change in the associated user's access is to be implemented in the respective selected resource.

4. The method of claim 3, further comprising:
determining whether the requested change in the associated user's access is completed by the indicated date and/or time; and
generating a completion signal or an error signal based on the determining.

5. The method of claim 4, wherein the generating includes:
generating the completion signal based on receiving confirmation of the requested change in the associated user's access in the event acknowledgement message by the indicated date and/or time; and
generating the error signal based on not receiving confirmation of the requested change in the associated user's access in the event acknowledgement message by the indicated date and/or time.

6. The method of claim 1, wherein the event acknowledgement message and its corresponding access change request message are linked by a message identifier.

7. The method of claim 1, wherein each respective selected resource includes at least one of a building of the organization, a facility of the organization, or a room of the organization.

8. The method of claim 7, wherein at least one associated user is an access card used to gain access to at least one of the building, facility, or room.

9. An access management system comprising:
a plurality of resources associated with an organization;
one or more processors; and
a memory coupled to the one or more processors and storing instructions that, when executed by the one or more processors, causes the access management system to:
receiving an access change request message identifying an associated user and requesting a change in the identified associated user's access to one or more selected resources of the plurality of resources, wherein the associated user is a person or a device;
transmitting an event message to each respective selected resource of the selected resources, each of the event messages identifying the associated user and instructing the respective selected resource to modify the associated user's access based on the requested change, wherein modifying the associated user's access to the respective selected resource includes at least one of granting, revoking, suspending, or modifying the associated user's access to the respective selected resource for a period of time; and
receiving, from each respective selected resource of the selected resources, an event acknowledgement message indicating whether the requested change in the associated user's access was successfully completed, wherein the event acknowledgement message and its corresponding access change request message are modified if the associated user is a device, and wherein the event acknowledgement message and its corresponding access change request message are not modified if the associated user is a person.

10. The access management system of claim 9, wherein, if the associated user is a person:
the access change request message indicates at least one of a role of the associated user in the organization, a work group of the organization to which the associated user belongs, or a change in the associated user's role or work group; and
the at least one of the role, work group, or change identifies the respective selected resource.

11. The access management system of claim 9, wherein the corresponding access change request message includes information indicating a date and/or a time at which the requested change in the associated user's access is to be implemented in the respective selected resource.

12. The access management system of claim 11, wherein execution of the instructions further causes the access management system to:
determining whether the requested change in the associated user's access is completed by the indicated date and/or time; and
generating a completion signal or an error signal based on the determining.

13. The access management system of claim 9, wherein a respective one of the selected resources includes an application program interface (API).

14. A non-transitory computer-readable storage medium including instructions that, when executed by one or more processors of an access management system, manages user access to a plurality of resources of an organization by performing operations comprising:
- receiving an access change request message identifying an associated user and requesting a change in the identified associated user's access to one or more selected resources of the plurality of resources, wherein the associated user is a person or a device;
- transmitting an event message to each respective selected resource of the selected resources, each of the event messages identifying the associated user and instructing the respective selected resource to modify the associated user's access based on the requested change, wherein modifying the associated user's access to the respective selected resource includes at least one of granting, revoking, suspending, or modifying the associated user's access to the respective selected resource for a period of time; and
- receiving, from each respective selected resource of the selected resources, an event acknowledgement message indicating whether the requested change in the associated user's access was successfully completed, wherein the event acknowledgement message and its corresponding access change request message are modified if the associated user is a device, and wherein the event acknowledgement message and its corresponding access change request message are not modified if the associated user is a person.

15. The non-transitory computer-readable storage medium of claim 14, wherein:
the access change request message indicates at least one of a role of the associated user in the organization, a work group of the organization to which the associated user belongs, or a change in the associated user's role or work group; and
the at least one of the role, work group, or change identifies the respective selected resource.

16. The non-transitory computer-readable storage medium of claim 14, wherein the corresponding access change request message includes information indicating a date and/or a time at which the requested change in the associated user's access is to be implemented in the respective selected resource.

17. The non-transitory computer-readable storage medium of claim 16, wherein execution of the instructions causes the system to perform operations further comprising:
- determining whether the requested change in the associated user's access is completed by the indicated date and/or time; and
- generating a completion signal or an error signal based on the determining.

18. The non-transitory computer-readable storage medium of claim 17, wherein the generating includes:
- generating the completion signal based on receiving confirmation of the requested change in the associated user's access in the event acknowledgement message by the indicated date and/or time; and
- generating the error signal based on not receiving confirmation of the requested change in the associated user's access in the event acknowledgement message by the indicated date and/or time.

19. The non-transitory computer-readable storage medium of claim 14, wherein the event acknowledgement message and its corresponding access change request message are linked by a message identifier.

* * * * *